United States Patent [19]

Arbib

[11] 4,441,924
[45] Apr. 10, 1984

[54] SOFT SOLDER MATERIAL FOR USE IN THE FORMATION OF A SOLDER BATH

[75] Inventor: Gordon F. Arbib, Hemel Hempstead, England

[73] Assignee: Multicore Solders Limited, Hemel Hempstead, England

[21] Appl. No.: 511,722

[22] Filed: Jul. 8, 1983

Related U.S. Application Data

[63] Continuation of Ser. No. 243,735, Mar. 15, 1981.

[30] Foreign Application Priority Data

Mar. 17, 1980 [GB] United Kingdom ............... 8008890

[51] Int. Cl.$^3$ ............................................. B23K 35/34
[52] U.S. Cl. ................................... 75/65 R; 148/24; 148/25; 228/56; 228/263.11; 428/558
[58] Field of Search ................... 75/65 R; 148/24–26; 228/56, 263; 428/558

[56] References Cited

U.S. PATENT DOCUMENTS 2,845,700  8/1958  Bagno ................................. 148/25
4,092,182  5/1978  Arbib ................................. 148/24
4,122,238 10/1978  Frantzerb ........................... 148/24

*Primary Examiner*—Peter D. Rosenberg
*Attorney, Agent, or Firm*—Finnegan, Henderson, Farabow, Garrett & Dunner

[57] ABSTRACT

Solder baths for use in the electronics industry are formed by converting into a molten condition a soft solder material in the form of an extruded bar of soft solder alloy having one or more cores composed of (I) esters of polyhydric alcohols of molecular weight of at least 300, (II) ester derivatives of rosin or modified rosin, (III) hydrocarbon resins, and/or (IV) polymeric waxes, so that the resulting solder bath is provided with a layer of anti-oxidant material derived from the cores which assists in preventing formation of oxide impurity on the surface of the molten solder bath and which may also act as a solder flux, thereby obviating the conventional necessity of applying a separate antioxidant material to the surface of the bath and of using a separate solder flux.

24 Claims, No Drawings

SOFT SOLDER MATERIAL FOR USE IN THE FORMATION OF A SOLDER BATH

This application is a continuation of application Ser. No. 243,735, filed Mar. 16, 1981.

This invention relates to soft soldering and is concerned with a soft solder material in the form of an extruded bar which can be used in the formation of solder baths such as those used in the electronics industry.

Soldering with a soft solder, i.e. a tin/lead based alloy melting at below about 400° C., is widely employed in the electronics industry, for example in the production of printed circuit assemblies. For the mass-production of such assemblies, the soldering operation can involve the use of a static or moving solder bath on to the surface of which the fluxed printed circuit assembly can be placed. In an automatic mass-soldering machine, the solder from the solder bath can be applied to the surface of the printed circuit assembly by so-called wave soldering, i.e. by forming a standing wave of molten soft solder against the crest of which the printed circuit assembly is caused to travel.

Such solder baths are normally prepared and maintained from soft solder in the form of an extruded or cast bar or ingot, generally of a 60/40 or 63/37 tin/lead solder alloy. It is essential for the solder bar or ingot to be of high purity solder alloy to ensure efficient operation of the solder bath. Likewise it is essential to maintain the molten bath as pure as possible, to avoid the formation of dross on the surface of the molten solder bath and to maintain the free-flowing property of the bath. A difficulty which arises in meeting these purity requirements stems from the tendency of both the solid and molten solder alloy to oxidise in air, with the result that a layer of oxide is formed on the surface of the solid or molten solder alloy. This oxide layer acts as an impurity in the molten solder bath and adds to the formation of dross at the surface of the molten bath. With a view to meeting the foregoing difficulty and hence maintaining the high purity of the molten solder bath, it is common practice to maintain on the molten solder bath a surface layer of antioxidant material, for example a hydrocarbon oil or low melting resinous solid, to help prevent the formation of oxide impurity on the surface of the molten solder bath.

We have now found, in accordance with the invention, that it is possible to form an extruded bar of soft solder alloy having one or more substantially uninterrupted cores extending longitudinally through the interior of the extruded bar, the or each core comprising an organic substance (as hereinafter specified) which, when the bar is melted to form or replenish a molten solder bath, will form on the surface of the bath a layer of anti-oxidant material derived from said core(s). In this manner, it is possible not only to avoid the trouble of applying a separate anti-oxidant material to the surface of the molten solder bath and of removing used anti-oxidant material from the surface of the solder bath, but also to ensure that the correct ratio of the amount of anti-oxidant material to that of solder is automatically maintained by appropriately sizing the diameter of the core or cores of the material within each extruded solder bar. In a preferred embodiment of the invention, the organic substance of the core(s) will be a substance which can act both as an anti-oxidant and also as a solder flux, since this may assist the soldering operation and may make it possible to dispense with a separate application of flux to a printed circuit assembly prior to the soldering operation.

The organic substance present as one or more cores in the soft solder bar in accordance with the present invention should generally be solid at ambient temperatures but have a melting point such that it will become liquid at normal solder bath temperatures, generally above 200° C. Substances melting in the range from 70° to 120° C. are preferred.

The organic substances which can be used to form the core or cores in an extruded bar of soft solder alloy in accordance with the invention are to be selected from the following classes of organic substances:

(I) Esters of polyhydric alcohols having molecular weights of at least 300, preferably a neutral ester derived from a polyhydric alcohol and at least one saturated or unsaturated fatty acid or monocarboxylic mononuclear aromatic acid, the ester advantageously having a molecular weight in the range from 300 to 3000. Particularly suitable esters are those derived from polyhydric alcohols containing from 2 to 8, preferably 3 to 6, hydroxyl groups such as, for example, esters derived from pentaerythritol, preferably pentaerythritol tetrabenzoate.

(II) Ester derivatives of rosin (principally abietic acid), or of a modified rosin, for example a rosin which has been hydrogenated or reacted with a Diels-Alder type reactant such as maleic anhydride. Particularly suitable esters are those derived from rosin or modified rosin and a polyhydric alcohol, preferably pentaerythritol or glycerol.

(III) Hydrocarbon resins derived from feedstocks of petrochemical origin. These generally have a melting range of from 80° to 150° C.

(IV) Polymeric waxes such as polyethylene glycols, polyethylene oxides, polyvinyl alcohols and polyacrylic acids.

If desired a mixture of different organic substances selected either from the same class or from two or more of the foregoing classes (I), (II), (III) and (IV) may be employed to improve stability and wetting properties. Thus in a preferred embodiment of the invention, the or each core can be formed from a mixture of an ester of class (I) and an ester derivative of class (II).

When the core comprises an ester of class (I), there is advantageously also incorporated in the core a wetting agent which can enable the ester to act as a flux as well as an anti-oxidant. The wetting agent may be an aliphatic or aromatic mono- or polycarboxylic acid, for example stearic acid, adipic acid, sebacic acid, or linoleic acid, or an amine hydrochloride, for example cyclohexylamine hydrochloride or triethylamine hydrochloride.

The soft solder bar incorporating one or more cores in accordance with the invention may be of any suitable cross-section, for example of circular or generally trapezoidal cross-section. Each cored solder bar may weigh, for example, 1 or 0.5 kg.

The soft solder alloy employed in the manufacture of the cored solder bar of the invention will normally be a tin/lead alloy containing at least 1% by weight of tin with the balance being lead. For example, the alloy may be a 60/40 or 63/37 tin/lead alloy. If desired, the alloy may also contain minor proportions of one or more other metals, for example, up to 7% antimony, up to 3% copper, up to 20% cadmium or up to 10% silver, apart from any incidental elements and/or impurities.

The cored solder bar of the invention can be produced by extruding the solder alloy so as to form an elongate bar whilst simultaneously introducing into the extruding alloy one or more, for example three, cores of the desired organic substance and thereafter cropping the resulting cored bar to provide cored solder bars each weighing, for example, about 1 kg. It will be appreciated that for manufacturing a cored solder bar by the foregoing method, the organic substance for the core(s) should have a melting point which is lower than that of the soft solder alloy from which the solder bar is to be formed, so that the organic substance can be introduced in a flowable state into the molten solder alloy. The resulting cored solder bars may be packaged in plastics film or sheeting to prevent any tendency for the exterior of the solder bar to oxidise before use.

The following Examples illustrate the invention.

EXAMPLE 1

An anti-oxidant/flux core material was prepared by mixing together at a temperature of 120° C. the following constituents:

|  | % by weight |
|---|---|
| Pentaerythritol tetrabenzoate | 75 |
| Pentaerythritol ester of maleic modified rosin | 15 |
| Dimerised unsaturated $C_{18}$ fatty acid (EMPOL 1010) | 10 |

A soft solder alloy consisting of 60 weight percent tin and 40 weight percent lead was extruded in the form of an elongate bar of trapezoidal cross-section having three symmetrically positioned cylindrical cavities extending therethrough into which was simultaneously introduced the foregoing anti-oxidant/flux material in a molten state in order to form a three-cored extruded solder bar which was cropped to provide bars each weighing about 1 kg and measuring about 430 mm×25 mm×12.7 mm. The cored solder bars so produced were covered in a polyethylene film.

The cored solder bars obtained in the foregoing manner were subsequently fed, after removal of the polyethylene film, into a molten solder bath so that the anti-oxidant/flux material present as the cores in the solder bars formed a surface layer on the molten solder bath, which layer served both as an anti-oxidant covering layer for the solder bath and as a flux for use in soldering electronic components for printed circuit boards with the solder bath.

EXAMPLE 2

A cored solder bar was produced in the manner described in Example 1 from the following core material:

| Pentaerythritol tetrabenzoate | 40% by wt. |
|---|---|
| Hydrocarbon resin (HERCUREZ A 150) | 55% by wt. |
| Adipic acid | 5% by wt. |

EXAMPLE 3

A cored solder bar was produced in the manner described in Example 1 from the following core material:

| Pentaerythritol tetrabenzoate | 60% by wt. |
|---|---|
| Pentaerythritol ester of hydrogenated rosin (FORAL 105) | 35% by wt. |
| Adipic acid | 5% by wt. |

EXAMPLE 4

A cored solder bar was produced in the manner described in Example 1 from the following core material:

| Polyethylene glycol (BREOX PEG 20M) | 90% by wt. |
|---|---|
| Alkylated phenyl α-naphthylamine (ERGONOX LO6-antioxidant) | 10% by wt. |

What is claimed is:

1. A soft solder material in the form of an extruded bar of tin/lead soft solder alloy for use in the formation of a molten soft solder bath, said material comprising: at least one substantially uninterrupted core extending longitudinally through the interior of the extruded bar, wherein the core contains at least one organic substance in an amount sufficient to form an anti-oxidant coating on the surface of the molten bath, said substance being selected from at least one of the following classes:
   (I) esters of polyhydric alcohols having a molecular weight of at least 300;
   (II) ester derivatives of rosin or of a modified rosin;
   (III) hydrocarbon resins derived from feedstocks of petrochemical origin; and
   (IV) polymeric waxes selected from the group consisting of polyethylene glycols, polyethylene oxides, polyvinyl alcohols and polyacrylic acids.

2. A method of forming a solder bath for use in the production of electronics equipment, which comprises: forming in an extruded bar of tin/lead soft solder alloy at least one substantially uninterrupted core extending longitudinally through the interior of the extruded bar, said core comprising at leat one organic substance sufficient to act as an anti-oxidant selected from at least one of the following classes:
   (I) esters of polyhydric alcohols having a molecular weight of at least 300;
   (II) ester derivatives of rosin or of a modified rosin;
   (III) hydrocarbon resins derived from feedstocks of petrochemical origin; and
   (IV) polymeric waxes selected from the group consisting of polyethylene glycols, polyethylene oxides, polyvinyl alcohols and polyacrylic acids; and
converting into a molten condition the core containing extruded bar of soft solder material to form the solder bath, wherein the converting step includes the step of forming a layer of anti-oxidant material derived from said core on the surfaces of the molten bath.

3. A soft solder material as claimed in claim 1 wherein the core comprises an ester of class (I) and further comprises a wetting agent.

4. A soft solder material as claimed in claim 3, wherein the wetting agent is an aliphatic or aromatic mono- or polycarboxylic acid, or an amine hydrochloride.

5. A soft solder material as claimed in claim 1, wherein the core comprises an ester of class (I) which is an ester derived from a polyhydric alcohol and at least one saturated or unsaturated fatty acid or monocarboxylic mononuclear aromatic acid, the ester having a molecular weight in the range from 300 to 3000.

6. A soft solder material as claimed in claim 3, wherein the ester is derived from a polyhydric alcohol containing from 2 to 8 hydroxyl groups.

7. A soft solder material as claimed in claim 6, wherein the ester is pentaerythritol tetrabenzoate.

8. A soft solder material as claimed in claim 1, wherein the core comprises an ester derivative of class (II), said ester being an ester derivative of rosin or of a hydrogenated rosin or a maleic modified rosin.

9. A soft solder material as claimed in claim 8, wherein the ester is derived from pentaerythritol or glycerol.

10. A soft solder material as claimed in claim 1, wherein the core comprises an ester of class (I) and an ester derivative of class (II).

11. A soft solder material as claimed in claim 1, wherein the core comprises an ester of class (I), an ester derivative of class (II) and a wetting agent selected from aliphatic and aromatic mono- and polycarboxylic acids and amine hydrochlorides.

12. A soft solder material as claimed in claim 11, comprising a plurality of said cores each comprising pentaerythritol tetrabenzoate, the pentaerythritol ester of maleic modified rosin and dimerised unsaturated $C_{18}$ fatty acid.

13. A method according to claim 2, wherein, the core comprises an ester of class (I) and further comprises a wetting agent.

14. A method according to claim 13, wherein, the wetting agent is an aliphatic or aromatic mono- or polycarboxylic acid, or an amine hydrochloride.

15. A method according to claim 2, wherein the core comprises an ester of class (I) and at least one saturated or unsaturated fatty acid or monocarboxylic mononuclear aromatic acid, the ester having a molecular weight in the range from 300 to 3,000.

16. A method according to claim 15, wherein the ester is derived from a polyhydric alcohol containing from 2 to 8 hydroxyl groups.

17. A method according to claim 16, wherein the ester is pentaerythritol tetrabenzoate.

18. A method according to claim 2, wherein the core comprises an ester derivative of class (II), said ester being an ester derivative of rosin or of a hydrogenated rosin or a maleic modified rosin.

19. A method according to claim 18, wherein the ester is derived from pentaerythritol or glycerol.

20. A method according to claim 2, wherein the core comprises an ester of class (I) and an ester derivative of class (II).

21. A method according to claim 20 wherein the core further comprises a wetting agent selected from the group consisting of aliphatic and aromatic mono- and polycarboxylic acids and amine hydrochlorides.

22. A method according to claim 2 wherein the extruded bar of soft solder material comprises a plurality of cores, said cores comprising pentaerythritol tetrabenzoate, the pentaerythritol ester of maleic modified rosin and dimerized unsaturated $C_{18}$ fatty acid.

23. In a method of forming a molten solder bath from tin/lead solder alloy bars including a flux core for use in the production of electronics equipment, the improvement comprising:
   including in said flux core at least one organic substance in an amount sufficient to act an an anti-oxidant; and
   forming a molten anti-oxidant layer of said organic substance on the surface of said molten solder bath.

24. The improvement of claim 26 wherein the organic substance is included in said bar as one substantially uninterrupted longitudinal core, and wherein the organic substance is selected from at least one of the following classes:
   (I) esters of polyhydric alcohols having a molecular weight of at least 300;
   (II) ester derivatives of rosin or of a modified rosin;
   (III) hydrocarbon resins derived from feedstocks of petrochemical origin; and
   (IV) polymeric waxes selected from the group consisting of polyethylene glycols, polyethylene oxides, polyvinyl alcohols and polyacrylic acids.

* * * * *

UNITED STATES PATENT AND TRADEMARK OFFICE
CERTIFICATE OF CORRECTION

PATENT NO. : 4,441,924

DATED : April 10, 1984

INVENTOR(S) : GORDON F. ARBIB

It is certified that error appears in the above—identified patent and that said Letters Patent is hereby corrected as shown below:

Claim 24, line 33, change "claim 26" to --claim 23--.

Signed and Sealed this

Fourth Day of September 1984

[SEAL]

Attest:

*Attesting Officer*

GERALD J. MOSSINGHOFF

*Commissioner of Patents and Trademarks*